United States Patent
Seyedi-Esfahani (10) Patent No.: US 8,494,087 B2
(45) Date of Patent: Jul. 23, 2013

(54) METHOD AND SYSTEM TO REDUCE PAPR IN SINGLE CARRIER AND SCBT COMMUNICATIONS SYSTEMS

(75) Inventor: Seyed-Alireza Seyedi-Esfahani, Peekskill, NY (US)

(73) Assignee: Koninklijke Philips N.V., Eindhoven (NL)

( * ) Notice: Subject to any disclaimer, the term of this patent is extended or adjusted under 35 U.S.C. 154(b) by 758 days.

(21) Appl. No.: 12/441,592

(22) PCT Filed: Sep. 21, 2007

(86) PCT No.: PCT/IB2007/053846
§ 371 (c)(1),
(2), (4) Date: Mar. 17, 2009

(87) PCT Pub. No.: WO2008/038210
PCT Pub. Date: Apr. 3, 2008

(65) Prior Publication Data
US 2010/0239038 A1 Sep. 23, 2010

Related U.S. Application Data

(60) Provisional application No. 60/826,952, filed on Sep. 26, 2006.

(51) Int. Cl.
*H04L 27/36* (2006.01)
(52) U.S. Cl.
USPC ............ 375/298; 375/295; 375/296; 375/302
(58) Field of Classification Search
USPC .................................. 375/298, 295, 296, 302
See application file for complete search history.

(56) References Cited

U.S. PATENT DOCUMENTS

| 4,945,549 A | * | 7/1990 | Simon et al. | 375/280 |
| 5,150,381 A | * | 9/1992 | Forney et al. | 375/261 |
| 5,388,124 A | * | 2/1995 | Laroia et al. | 375/286 |

(Continued)

FOREIGN PATENT DOCUMENTS

| EP | 1128623 A1 | 8/2001 |
| EP | 1195917 A1 | 10/2002 |

OTHER PUBLICATIONS

D. Divsalar et al., "Combined Trellis Coding with Asymmetric Modulation", Proceedings of the Global Telecommunications Conference and Exhibition (GLOBECOM), vol. 2, Dec. 1985, pp. 646-652, XP000794847.

(Continued)

*Primary Examiner* — Kenneth Lam
(74) *Attorney, Agent, or Firm* — Larry Liberchuk (57) ABSTRACT

The system (800), transmitter (600), receiver (700), and method of the present invention provide a technique to reduce the Peak to Average Power Ratio (PAPR) for the single carrier and single carrier block transmission (SCBT) modulations, especially when non-symmetric constellations (e.g. BPSK) are used. The constellation used for the modulation of each symbol, is rotated by a phase. Only the constellation is rotated, and the mapping of the bits into each constellation may or may not be similar. Further, in alternative embodiments the modulated bits are either encoded or not encoded. In a further alternative embodiment, a Trellis Coded Modulation (TCM) is used. Because the phase rotation is known a priori, or can be determined from a priori known information, it can easily be corrected at the receiver.

16 Claims, 7 Drawing Sheets

U.S. PATENT DOCUMENTS

| | | | | |
|---|---|---|---|---|
| 5,606,578 | A * | 2/1997 | O'Dea | 375/298 |
| 6,459,723 | B1 | 10/2002 | Kim | |
| 7,139,322 | B1 * | 11/2006 | Nergis | 375/260 |
| 2004/0264599 | A1 * | 12/2004 | Lliev | 375/298 |
| 2005/0163243 | A1 * | 7/2005 | Chung et al. | 375/267 |
| 2006/0034390 | A1 | 2/2006 | Vummintala | |
| 2006/0039490 | A1 * | 2/2006 | Tzannes et al. | 375/260 |
| 2008/0049864 | A1 * | 2/2008 | Eriksson et al. | 375/269 |

OTHER PUBLICATIONS

M.B. Pursley et al., Phase-Shift-Key Modulation for Multimedia Multicast Transmission in Mobile Wireless Networks, IEEE Military Communications Conference, Conference Proceedings, vol. 1, Oct. 1996, pp. 210-214, XP010203983.

F. Nadal et al., "Peak-to-Average Power Ratio Reduction in CDMA Systems Using Constellation Extension", 2005 IEEE 16th International Symposium on personal, Indoor and Mobile Communications.

* cited by examiner

METHOD AND SYSTEM TO REDUCE PAPR IN SINGLE CARRIER AND SCBT COMMUNICATIONS SYSTEMS

The system, apparatus, and method of the present invention provides a technique to reduce the Peak to Average Power Ratio (PAPR) for the single carrier and single carrier block transmission (SCBT) modulations, especially when circularly non-symmetric constellations (e.g. BPSK) are used.

Peak to Average Power Ratio (PAPR) is one of the important measures in the performance of a communications signal. PAPR is the ratio of peak instantaneous signal power, $P_{peak}$, to the average signal power, $P_{ave}$. The importance of the PAPR arises from the fact that practical transmitters (particularly power amplifiers) have a limited linear dynamic range, i.e. if the signal value exceeds a certain limit non-linear distortion is caused. Besides adding noise (distortion) to the desired signal, non-linear distortion will create harmonics of the signal; hence it increases the out-of-band emissions of the transmitter.

To avoid this, the signal must be kept within the linear range of the transmitter. Given a specific value for the PAPR, this limit on the peak value of the signal implies a limit on the average transmitted power. Hence it is beneficial to design signals having a small PAPR value.

The PAPR depends on the modulation Single Carrier, Single Carrier Block Transmission (SCBT) or OFDM, constellation (PSK, QAM) and pulse shape.

One of the methods used to reduce the PAPR of a QPSK modulated signal is known as π/4-QPSK. In this method every other QPSK modulated symbol is rotated by an angle of π/4 radians. As a result, the pulses that correspond to different symbols do not add with the same phase. Furthermore, the resulting signal, as going from constellation points of one symbol to the next, does not require going through zero. However, to the best knowledge of the inventor, similar methods for other constellations do not exist.

Therefore, a means for achieving a small PAPR value is needed.

The present invention provides an apparatus, method and system for reducing PAPR of single carrier and SCBT modulations.

In a preferred embodiment, the constellation used for the modulation of each symbol, is rotated by a phase. Only the constellation is rotated, and the mapping of the bits into each constellation may or may not be similar. Further, in alternative embodiments the modulated bits are either encoded or not encoded. In a further alternative embodiment, Trellis Coded Modulation (TCM) or Multi-Level Coded Modulation (MLCM) is used.

Because the phase rotation is known a priori, or can be determined from a priori known information, it can easily be corrected at the receiver.

Figure 2A:
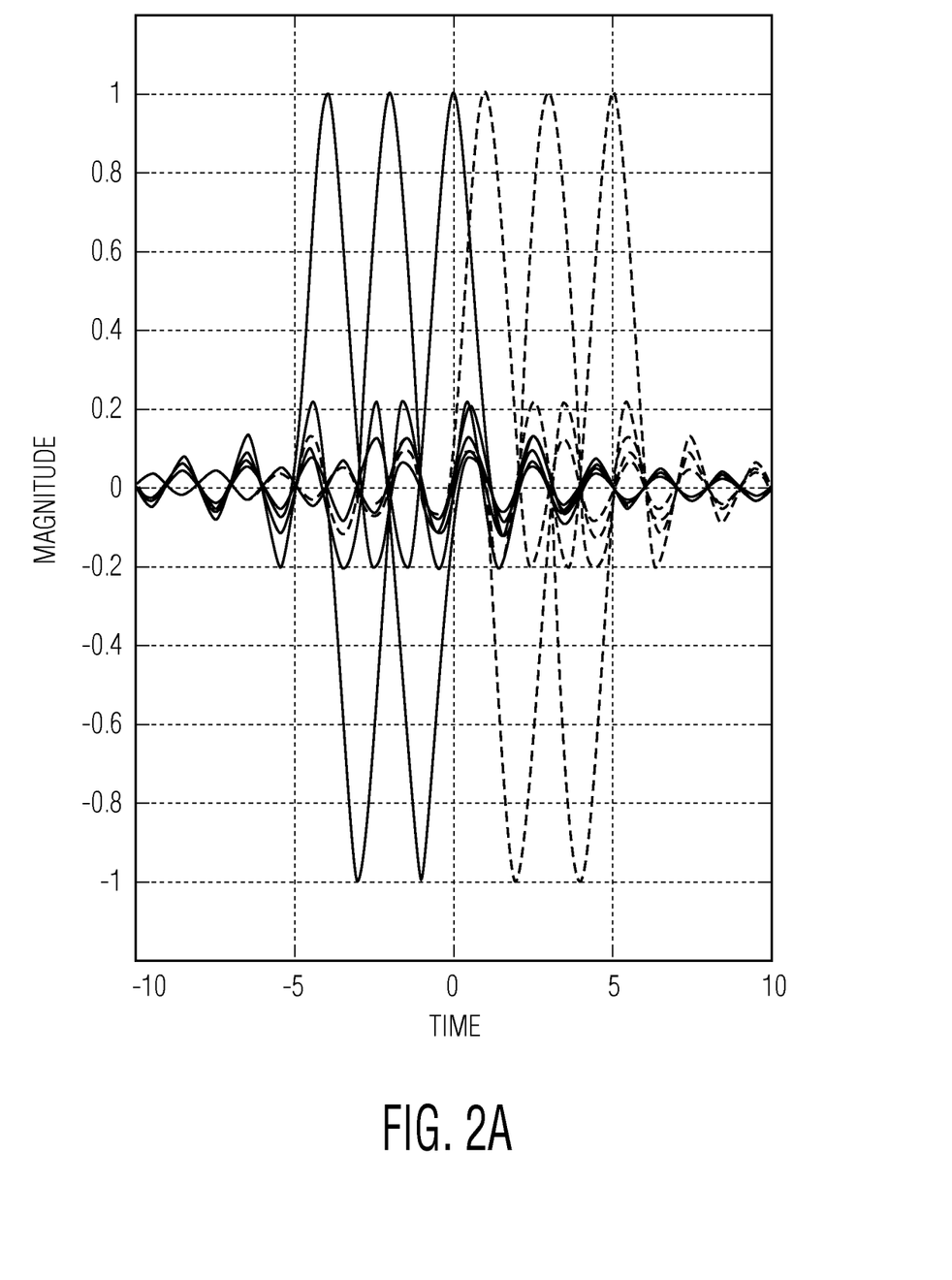
FIG. 2 illustrates PAPR for ten consecutive BPSK symbols with a Sinc pulse, with and without constellation rotation.
Figure 2B:
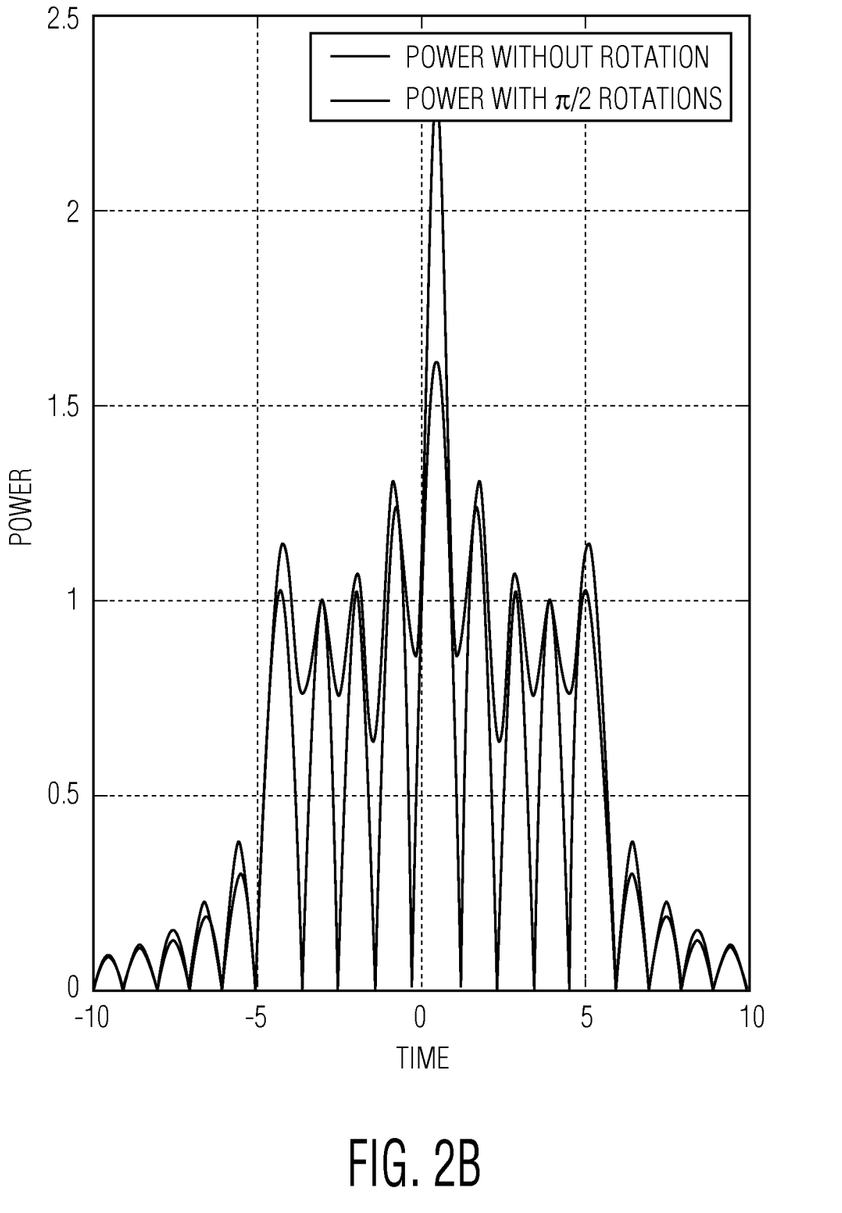

Once the modification according to the present invention is made in the phase of consecutive constellations, a significant reduction of the PAPR of the resulting signal occurs. For example, consider ten consecutive BPSK symbols with a Sinc pulse (FIG. 2). It can be seen that if these ten symbols happen to be equal to {1, −1, 1, −1, 1,1, −1, 1, −1, 1} (This is the sequence that creates the largest peak at t=0.5), the addition of the ten pulses creates a rather large peak. However when the constellation for each symbol is rotated by π/2, the resulting sum does not have a large peak. Similar results apply for many other constellations and pulse shapes.

The present invention, by generalizing the concept used in π/4-QPSK, provides an apparatus, method and system that significantly reduces the PAPR for the single carrier and SCBT modulations, especially when non-symmetric constellations (e.g. BPSK) are used.

FIG. 1 illustrates rotated constellations for rectangular 8QAM: (a) n mod 3=−1, (b) n mod 3=0, (c) n mod 3=1;

FIG. 3 illustrates 8QAM constellations: (a) Rectangular 8QAM, (b) Non-Square (NS) 8QAM, (c) Star 8QAM, (d) Square 8QAM;

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and structure may be omitted from the current descriptions so as not to obscure the present invention.

The present invention provides an apparatus, method and system that significantly reduces the PAPR for the single carrier and SCBT modulations, especially when non-symmetric constellations (e.g. BPSK) are used.

Figure 1A:
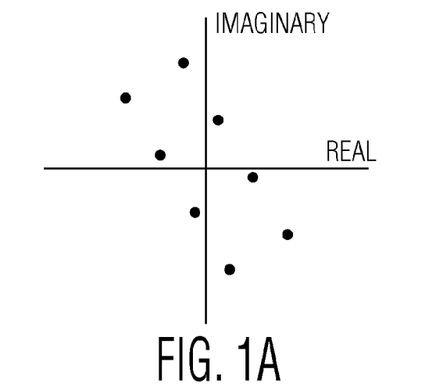
Figure 1B:
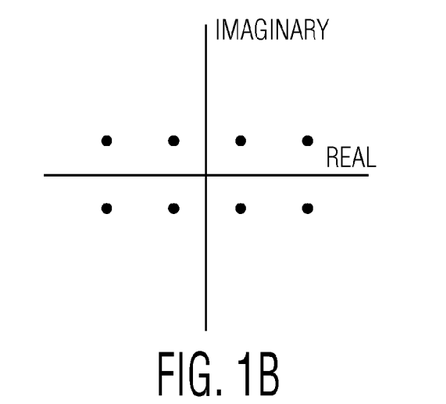
Figure 1C:
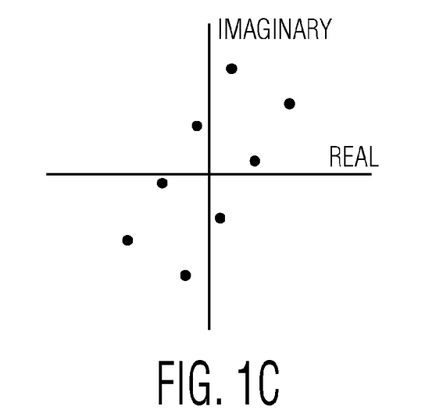

In preferred embodiments, the constellation used for the modulation of each symbol, s[n], is rotated by a phase φ[n]. For example, a BPSK constellation and φ[n]=0 can be employed for even n and φ[n]=π/2 for odd n. This means that all of the odd numbered symbols use the constellation {1,−1} and all the even numbered symbols use the constellation {j, −j}. Another example is to use a Rectangular 8QAM constellation and φ[n]=(n mod 3)π/3. In this case the constellations are depicted in FIG. 1.

It should be noted that only the constellation is rotated, and the mapping of the bits into each constellation may or may not be similar. Also, the modulated bits may or may not be encoded. It is also possible that a Trellis Coded Modulation (TCM) or Multi-Level Coded Modulation (MLCM) is used.

As noted above, since the phase possible that a Trellis Coded Modulation (TCM) or Multi-Level Coded Modulation (MLCM) is used.rotation is known a priori, or can be determined from a priori known information, it can easily be corrected at the receiver.

If the modification in the phase of consecutive constellations is performed according to an embodiment of the present invention, it can significantly reduce the PAPR of the resulting signal. For example, consider ten consecutive BPSK symbols with a Sinc pulse (FIG. 2). It can be seen that if these ten symbols happen to be equal to {1, −1, 1, −1, 1, 1, −1, 1, −1, 1} (This is the sequence that creates the largest peak at t=0.5), the addition of the ten pulses creates a rather large peak. However, when the constellation for each symbols is rotated by π/2 (multiplied by j), the resulting sum does not have a large peak. Similar observations can be made for many other constellations and pulse shapes.

Embodiment 1: Incrementing Phase Modification

Figure 4:
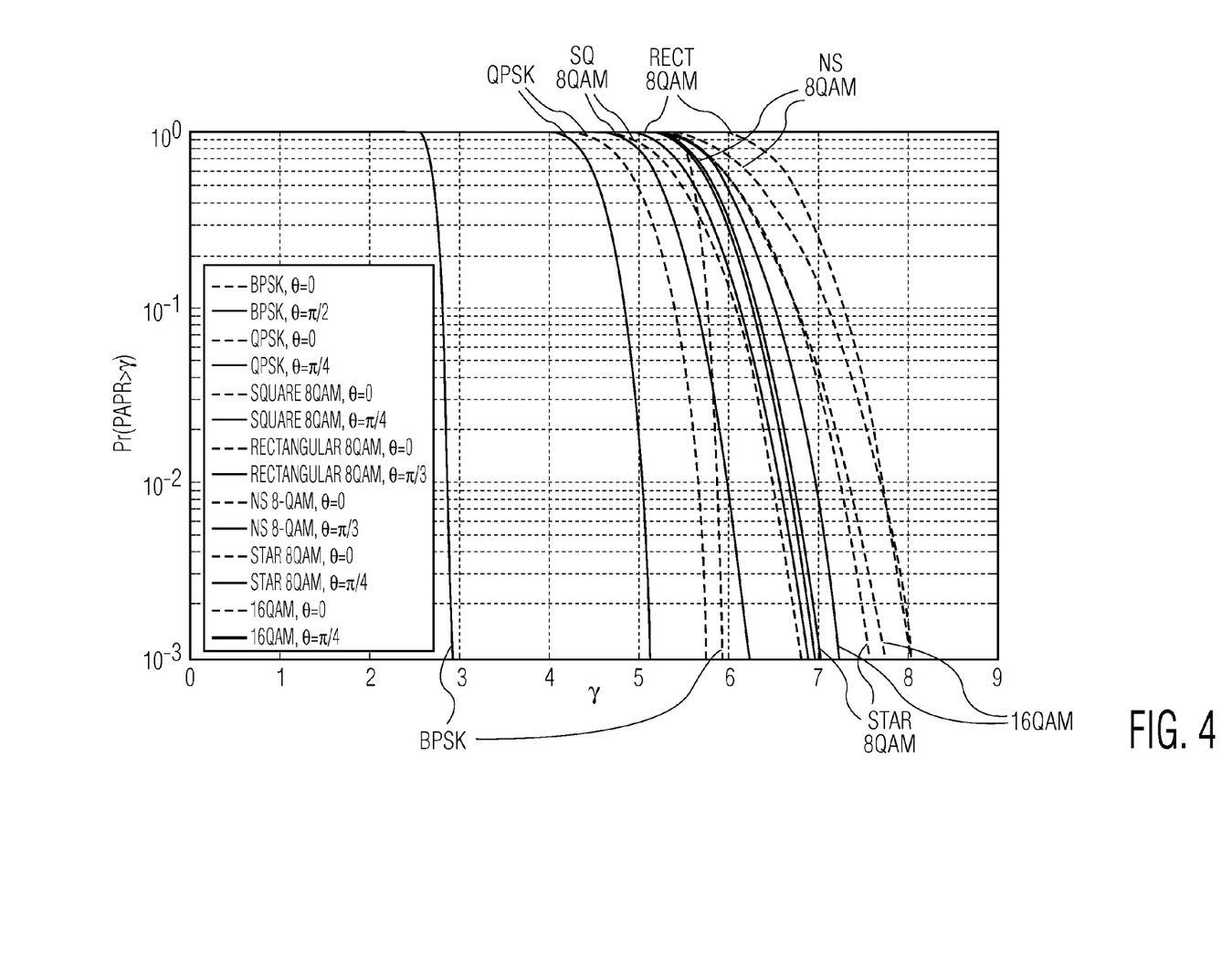
FIG. 4 illustrates PAPR of SCBT system with different constellations, with and without phase modifications.

In a first embodiment of the present invention, the phase rotation for each constellation, φ[n], is obtained by incrementing the previous phase by a constant value, i.e.

$$\phi[n]=\phi[n-1]+\theta$$

and for a given constellation, the optimum value of θ can be found using simulations. The PAPR performance of an SCBT system with BPSK, QPSK, various 8QAM (FIG. 2) and 16QAM constellations, with and without this phase rotation is depicted in FIG. 4. Obviously, similar technique can be used for other constellations such as 32QAM, 64QAM, etc.

Significant gains in PAPR are achieved. Particularly, the gains achieved (at P(PAPR>γ)=0.01) are given in Table 1:

TABLE 1

| Constellation | Gain in PAPR (dB) |
|---|---|
| BPSK | 3.0 |
| QPSK | 0.6 |
| Rectangular 8QAM | 1.1 |
| Non-Square 8QAM | 1.1 |
| Star 8QAM | 0.6 |
| Square 8QAM | 0.6 |
| 16QAM | 0.5 |

Figure 3A:
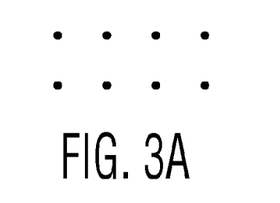
Figure 3B:
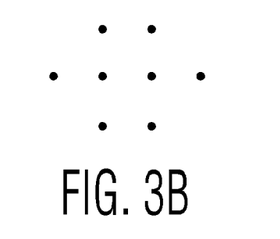
Figure 3C:
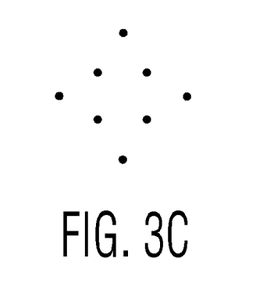
Figure 3D:
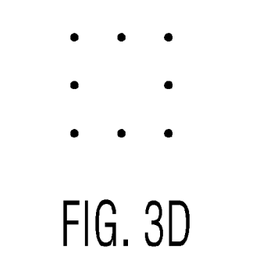
Figure 5:
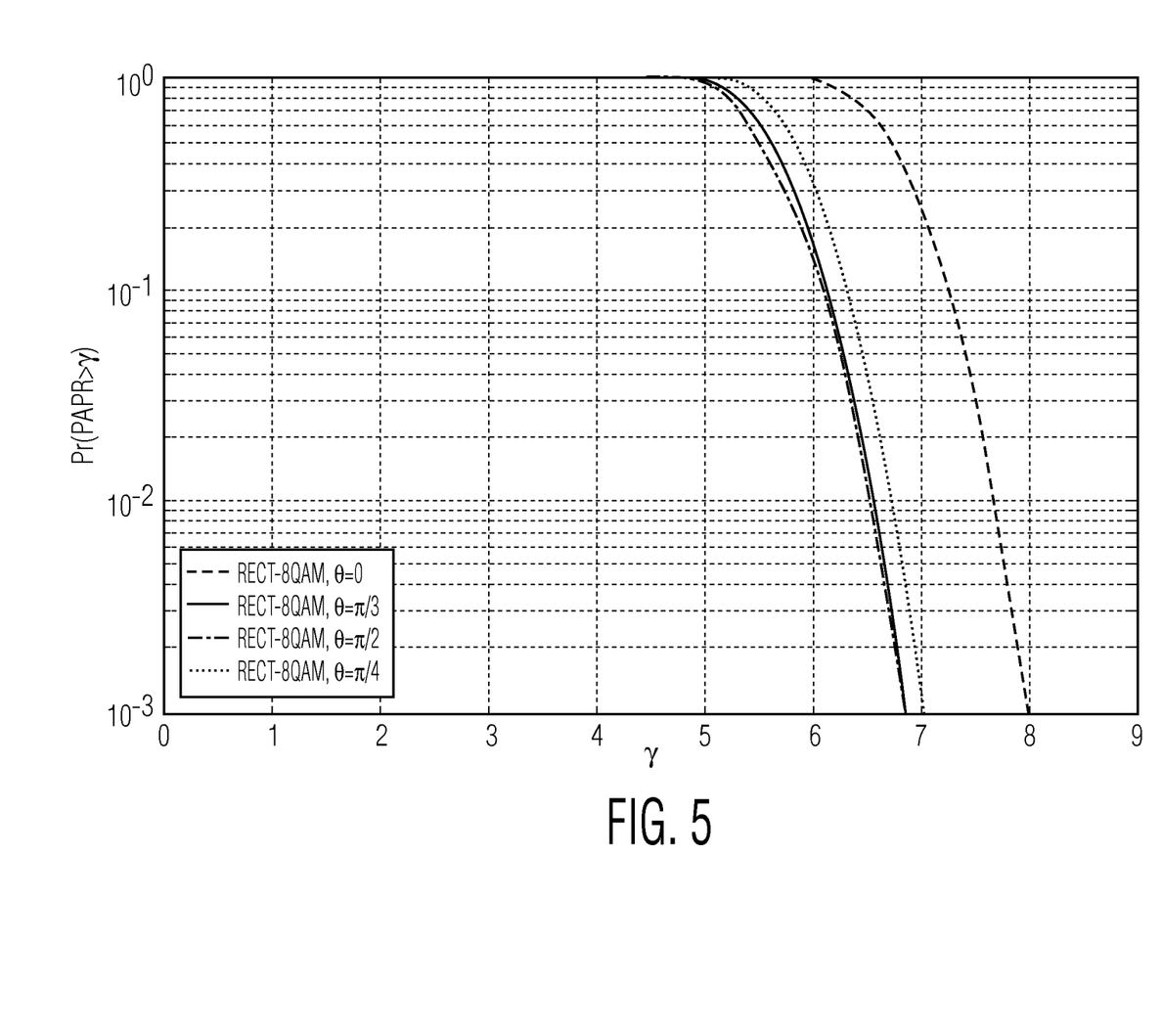
FIG. 5 illustrates PAPR of Rect-8QAM with different phase rotations.

It is readily seen that in many cases the present invention can be implemented with little or no additional complexity. Also, it is easily shown that good results are obtained by employing a good but not necessarily optimal value of θ. For example, FIG. 5 compares the PAPR performance of an SCBT system with Rectangular 8QAM modulation with θ=π/3, θ=π/2 and θ=π/4. It can be seen that although θ=π/3 results in the best performance, θ=π/2 and θ=π/4 also provide similar reduction in PAPR (approx 1 dB). These latter rotations, however, are easier to implement in practice. For example a rotation of θ=π/2 in a Rectangular 8QAM constellation (FIG. 3(a)) can simply be implemented by switching the in-phase and quadrature components.

Embodiment 2: Pseudo-Random Phase Modification

In a second embodiment of the present invention, the phase modification is obtained using a pseudo-random number generator.

Embodiment 3: Stored phase modification

In a third embodiment of the present invention, the phase modification is obtained from a predetermined and stored table.

Figure 6:
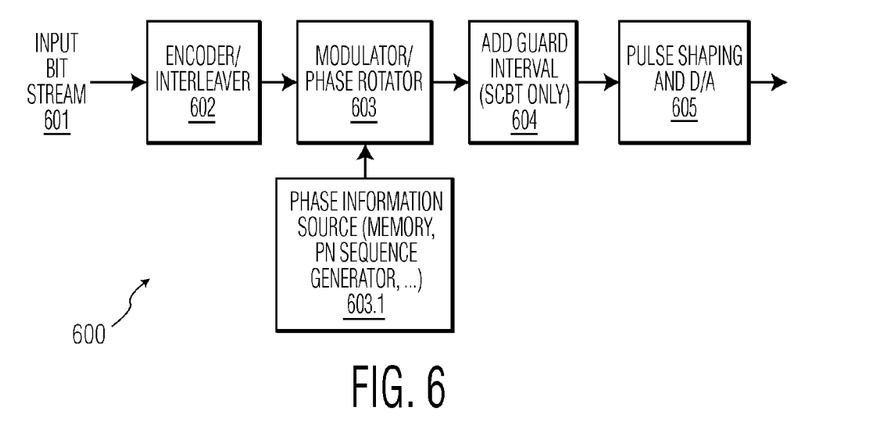
FIG. 6 illustrates a transmitter modified according to the present invention.

FIG. 6 illustrates a block diagram of a transmitter 600 modified according to the present invention. The input bit stream 601 is potentially encoded and interleaved 602. Then the data are modulated using a phase rotated constellation according to the present invention at 603. Then, in a SCBT system, Guard Interval (Cyclic Prefix or Zero Padding) is inserted 604. After the pulse shaping and Analog to Digital conversion 605, the resulting waveform can exhibit large peaks when the constellation phase rotation of the present invention is not performed at 603. Correspondingly, when there are large peaks the PAPR is high and a high PAPR is undesirable since it requires a large dynamic range of the D/A converter 605 and in the RF chain. By modifying a transmitter 600 according to the present invention to rotate the constellation 603 using any of embodiments 1-3 of the present invention, and alternatives thereof, the peaks are greatly reduced. It should be noted that other processing can take place at the transmitter 600 with respect to the bit stream and not only at the dashed arrows location.

Figure 7:
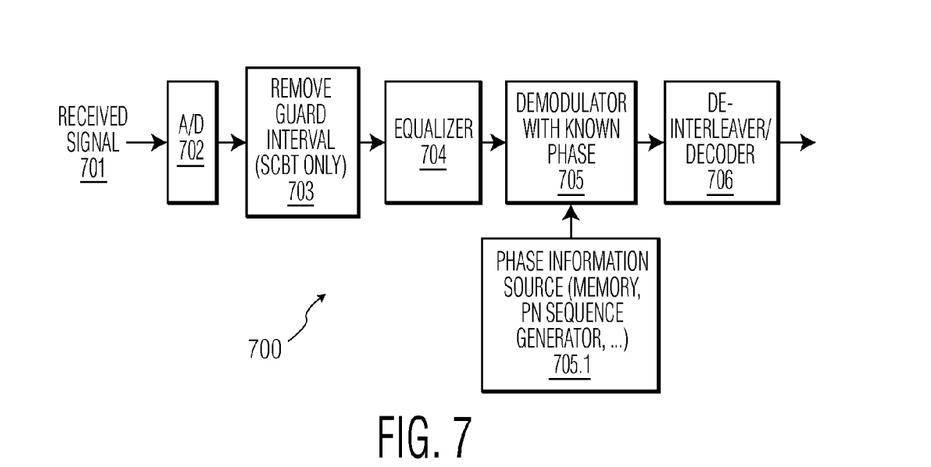
FIG. 7 illustrates a receiver modified according to the present invention.

FIG. 7 illustrates a block diagram of a receiver 700 modified to take into account the constellation phase rotation of the present invention. The received signal 701 is A/D converted at 702 and the Guard Interval is removed 703. The signal is then equalized in 704 to remove the impairments caused by the channel. Then the known phase rotation is accounted for in the demodulation of this stream at 705. The decoded bits are then potentially decoded and deinterleaved. Other processing can take place at the receiver and not only at the dashed line location illustrated in FIG. 7.

Figure 8:
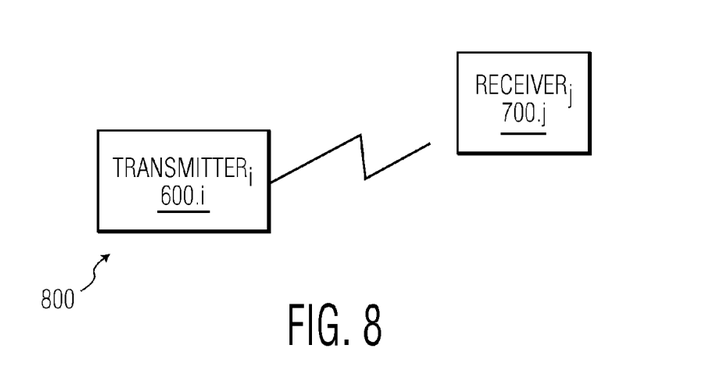
FIG. 8 illustrates a communication system modified according to the present invention.

FIG. 8 illustrates a communication system modified to reduce PAPR comprising at least one transmitter 600.i modified according to the present invention and at least one receiver 700.j modified according to the present invention.

While the preferred embodiments of the present invention have been illustrated and described, it will be understood by those skilled in the art that the system, apparatus and methods as described herein are illustrative and various changes and modifications may be made and equivalents may be substituted for elements thereof without departing from the true scope of the present invention. In addition, many modifications may be made to adapt the teachings of the present invention to a particular situation without departing from its central scope. Therefore, it is intended that the present invention not be limited to the particular embodiments disclosed as the best mode contemplated for carrying out the present invention, but that the present invention include all embodiments falling within the scope of the claim appended hereto as well as all implementation techniques an not just the object oriented approach to implementation used as an example.

I claim:

1. A method for reducing peak to average power ratio (PAPR) of a consecutive stream of symbols s[n] of a communication stream where n>1, comprising:
   specifying a constellation for modulating the communication stream;
   for each consecutive symbol s[n], performing:
      determining a phase modification φ[n] of the specified constellation for each consecutive symbol s[n];
      rotating the specified constellation by the determined phase φ[n];
      modulating the consecutive symbol s[n] with the rotated constellation; and
   at a receiver of the stream of symbols, determining the phase rotation based on predetermined information and correcting the phase rotation.

2. The method of claim 1, wherein the modulating further comprises providing a code selected from the group consisting of trellis code modulation (TCM), a convolutional code with interleaving, a convolutional code without interleaving, and a multi-level coded modulation (MLCM).

3. The method of claim 1, wherein the determining further comprises selecting the phase modification φ[n] from the group consisting of incremented, pseudo-random, and stored table.

4. The method of claim 3, wherein the stored table provides a near optimal φ[n] such that the rotation is less complex to implement than a corresponding optimal rotation.

5. The method of claim 1, wherein for a given Constellation the rotating further comprises selecting the rotation φ[n] from the following table:

| Constellation | φ[n] |
|---|---|
| BPSK | φ[n] = 0 when n is even |
|  | φ[n] = π/2 when n is odd |
| Square (SQ) 8QAM | (n mod 4) π/4 |
| Rectangular 8QAM | (n mod 3) π/3 |
| Rectangular 8QAM | (n mod 2) π/2 |
| Non-Square (NS) 8QAM | (n mod 3) π/3 |
| Non-Square (NS) 8QAM | (n mod 2) π/2 |

-continued

| Constellation | φ[n] |
| --- | --- |
| Star 8QAM | (n mod 4) π/4 |
| 16QAM | (n mod 4) π/4 |

6. A transmitter comprising:
a memory to store at least one pre-determined constellation phase modification/rotation s[n] for modulation of consecutive symbols s[n] of a communication stream where n>1; and
a modulator/phase rotator to modify/rotate a phase of a modulation constellation for each consecutive symbol of the communication stream by a function of one of the at least one pre-determined phase modification/rotation φ[n] stored in the memory, wherein a stream is transmitted thereby having low peak to average power ratio.

7. The method of claim 6, wherein the modulator is further configured to use a code selected from the group consisting of trellis code modulation (TOM), a convolutional code with interleaving, a convolutional code without interleaving, and a multi-level coded modulation (MLCM).

8. The transmitter of claim 7, wherein the at least one pre-determined phase modification is selected from the group consisting of incremented, pseudo-random, and stored table.

9. The transmitter of claim 8, wherein the stored table provides a near optimal φ[n] such that the rotation is less complex to implement than a corresponding optimal rotation.

10. The transmitter of claim 9, wherein for a given Constellation the stored modification/rotation comprises φ[n] selected from the following table:

| Constellation | φ[n] |
| --- | --- |
| BPSK | φ[n] = 0 when n is even |
|  | φ[n] = π/2 when n is odd |
| Square (SQ) 8QAM | (n mod 4) π/4 |
| Rectangular 8QAM | (n mod 3) π/3 |
| Rectangular 8QAM | (n mod 2) π/2 |
| Non-Square (NS) 8QAM | (n mod 3) π/3 |
| Non-Square (NS) 8QAM | (n mod 2) π/2 |
| Star 8QAM | (n mod 4) π/4 |
| 16QAM | (n mod 4) π/4 |

11. A communication system for transmission of a communication stream of consecutive symbols s[n], comprising:
at least one transmitter that modifies/rotates a constellation with a known rotation, modulates consecutive symbols s[n] of the communication stream with the rotated constellation and transmits the modulated stream, said transmitted stream thereby having low peak to average power ratio (PAPR); and
at least one receiver to receive the modulated/rotated stream, determine the phase rotation from predetermined information, and correct the known rotation of the stream.

12. The system of claim 11, wherein the constellation is a code selected from the group consisting of trellis code modulation (TCM), a convolutional code with interleaving, a convolutional code without interleaving, and a multi-level coded modulation (MLCM).

13. The system of claim 12, wherein the at least one transmitter (600) further comprises:
a memory to store at least one pre-determined constellation phase modification/rotation φ[n] for modulation of consecutive symbols s[n] of a communication stream where n>1; and
a modulator/phase rotator to modify/rotate a phase of a modulation constellation for each consecutive symbol of the communication stream by a function of one of the at least one pre-determined phase modification/rotation φ[n] stored in the memory, wherein a stream is transmitted thereby having low peak to average power ratio.

14. The system of claim 12, wherein the at least one pre-determined phase modification is selected from the group consisting of incremented, pseudo-random, and stored table.

15. The system of claim 14, wherein the stored table provides a near optimal φ[n] such that the rotation is less complex to implement than a corresponding optimal rotation.

16. The system of claim 13, wherein for a given Constellation the stored modification/rotation comprises selecting φ[n] from the following table:

| Constellation | φ[n] |
| --- | --- |
| BPSK | φ[n] = 0 when n is even |
|  | φ[n] = π/2 when n is odd |
| Square (SQ) 8QAM | (n mod 4) π/4 |
| Rectangular 8QAM | (n mod 3) π/3 |
| Rectangular 8QAM | (n mod 2) π/2 |
| Non-Square (NS) 8QAM | (n mod 3) π/3 |
| Non-Square (NS) 8QAM | (n mod 2) π/2 |
| Star 8QAM | (n mod 4) π/4 |
| 16QAM | (n mod 4) π/4 |

* * * * *